United States Patent [19]

Paneth et al.

[11] Patent Number: 4,644,561
[45] Date of Patent: Feb. 17, 1987

[54] MODEM FOR RF SUBSCRIBER TELEPHONE SYSTEM

[75] Inventors: Eric Paneth; David N. Critchlow, both of San Diego, Calif.; Moshe Yehushua, Kiriat Yam, Israel

[73] Assignee: International Mobile Machines Corp., Philadelphia, Pa.

[21] Appl. No.: 713,923

[22] Filed: Mar. 20, 1985

[51] Int. Cl.4 .............................................. H04L 27/18
[52] U.S. Cl. ........................................ 375/9; 327/105; 332/9 R; 375/53; 375/56; 375/67; 375/85
[58] Field of Search ...................... 375/52, 53, 54, 56, 375/57, 60, 67, 83, 84, 85, 86, 8, 9; 329/50, 105, 122, 124; 332/9 R, 10

[56] References Cited

U.S. PATENT DOCUMENTS

| 3,204,029 | 8/1965 | Groff et al. | 375/54 |
| 3,845,412 | 10/1974 | Rearwin et al. | 375/54 |
| 4,087,752 | 5/1978 | Melvin | 375/84 |
| 4,253,067 | 2/1981 | Caples et al. | 375/84 |
| 4,263,670 | 4/1981 | Sherman | 375/84 |
| 4,425,665 | 1/1984 | Stauffer | 375/9 |
| 4,481,640 | 11/1984 | Chow et al. | 375/56 |
| 4,523,311 | 6/1985 | Lee et al. | 370/69.1 |

Primary Examiner—Benedict V. Safourek
Attorney, Agent, or Firm—Arthur A. Jacobs

[57] ABSTRACT

A modem including a modulator section for converting a bit stream, wherein each given number of successive bits defines a symbol, into a phase modulated intermediate frequency (IF) signal, the symbols in the modulator section being phase modulated and then digitally filtered to provide a filtered signal that, when converted into an analog signal, provides a modulation signal of a frequency that is centered about a predetermined frequency and deviates therefrom in accordance with the value of the phase modulated symbol, the analog signal then being filtered and passed to a mixer for up conversion to an IF signal; and a demodulator section for converting the IF signal into a bit stream, the demodulator section including a microprocessor which not only filters received digital signals but contains a memory for storing filter coefficients for use in the filtering of received digital signals; the modem being also operable in a training mode wherein a sequence of predetermined symbols is provided to the filter in the modulator section and the resultant phase modulated IF signal is receivable in the demodulator section, the microprocessor acting to adjust the filter coefficients stored in its memory until the reconstructed phase modulated symbols correspond to the sequence of predetermined symbols provided to the filter in the modulator section.

24 Claims, 7 Drawing Figures

MODEM FOR RF SUBSCRIBER TELEPHONE SYSTEM

BACKGROUND OF THE INVENTION

The present invention generally pertains to communications systems and is particularly directed to a modem for converting a bit stream into a phase modulated intermediate frequency (IF) signal for use in an RF subscriber telephone system.

SUMMARY OF THE INVENTION

The modem of the present invention includes a modulator section and a demodulator section. The transmitter section is a system for converting a bit stream, wherein each given number of successive bits defines a symbol, into a phase modulated intermediate frequency (IF) signal at a predetermined IF frequency. The modulator section phase modulates each symbol; digitally filters each phase modulated symbol to provide a filtered signal that, when converted to an analog signal, provides a modulation signal of a modulation frequency that is centered about a predetermined frequency and deviates therefrom in accordance with the value of the phase modulated symbol; converts the filtered signal into an analog signal to provide the modulation signal; and mixes the modulation signal with a steady-state signal at a predetermined frequency to provide a phase modulated IF signal that is a frequency modulated (FM) signal having an IF frequency that is a modulation product of the modulation frequency and the predetermined frequency.

The demodulator section of the modem includes a demodulating system for converting a received phase modulated IF signal to the bit stream from which the received phase modulated IF signal was derived.

The Modem of the present invention can operate in a transmit mode, a receive mode, in a time-multiplexed transmit/receive mode or in a training mode.

When operating in the transmit mode, the modem modulator section receives a digital binary bit stream of up to four bits per symbol and then converts the symbols into a phase modulated IF signal at a predetermined IF frequency of 20.2 MHz. The modulated IF signal is transferred to an RF unit for up-conversion and transmission on the proper UHF frequency.

When operating in the receive mode, the modem receiver section receives a phase modulated IF signal from an RF receiver unit. The modem filters and downconverts the received IF signal to baseband frequency and digitizes the same into a complex (I,Q) sample at a predetermined symbol rate of 16 Ksps (Kilosymbols per second). A digital FIR filter performs further filtering and the complex samples are converted to a digital binary bit stream. The binary bit stream is then output to a baseband unit.

The modem further performs functions to provide for symbol synchronization measurement of link quality, and various control and status reporting functions.

At certain intervals, the modem may be placed in a training mode. In this mode, the modem modulator and demodulator sections are looped back through the RF unit in order to train the demodulator section FIR filter for changes in the system (mainly the RF unit filters) that may have changed with temperature or age, adjoining channel attenuations, or other environment fluctuations. The FIR filter of the demodulator section trains its coefficients to counteract any filter imperfections in order to achieve the best input signal possible. During this loopback, the modem transmitter section puts out a fixed training pattern known to the modem demodulator section. The demodulator section FIR filter adjusts (trains) its coefficients according to the signal itself, delayed and advanced signals, and signals from the adjacent bands.

The modem of the present invention is particularly useful in a radio-telephone system described in a copending U.S. patent application Ser. No. 713,925 entitled "Subscriber RF Telephone System for Providing Multiple Speech and/or Data Signals Simultaneously Over Either a Single or a Plurality of RF Channel", by Eric Paneth and Mark J. Handzel filed on even date herewith. The preferred embodiment of the modem described herein is interfaced with a channel control unit (CCU) and RF units described in said copending application, and the disclosure of said copending application that is pertinent to this specification is incorporated herein by reference.

Additional features of the present invention are discussed in relation to the description of the preferred embodiment.

GLOSSARY OF ACRONYMS

Glossary of acronyms used in the Specification

| ACRONYM | DEFINITION |
|---------|------------|
| A/D | Analog-to-Digital Converter |
| AGC | Automatic Gain Control |
| AM | Amplitude Modulation |
| BPSK | Binary Phase Shift Keying Modulation |
| BS | Base Station |
| CCU | Channel Control Unit |
| D/A | Digital-to-Analog Converter |
| dB | Decibels |
| DPSK | Differential Phase Shift Keying Modulation |
| ECL | Emitter-coupled Logic |
| FCC | United States Federal Communications Commission |
| FIFO | First-in First-out Memory |
| FIR | Finite-Duration Impulse-Response filter |
| Hz | Hertz (cycles per second) |
| I | In-phase |
| IF | Intermediate Frequency |
| KHz | KiloHertz |
| Ksps | Kilosymbols per second |
| LSB | Least Significant Bit |
| MHz | MegaHertz |
| MODEM | Combined Modulator and Demodulator |
| OCXO | Oven Controlled Crystal Oscillator |
| Q | Quadrature |
| QPSK | Quadrature Phase Shift Keying Modulation |
| RAM | Random Access Memory |

| ACRONYM | DEFINITION |
|---|---|
| RCC | Radio Control Channel |
| RELP | Residual Excited Linear Prediction |
| RF | Radio Frequency |
| RFU | Radio Frequency Unit |
| ROM | Read-only Memory |
| RX | Receive |
| STIMU | System Timing Unit |
| SUB | Subscriber Station |
| TDMA | Time Division Multiple Access |
| TX | Transmit |
| UHF | Ultra-High Frequency |
| VCXO | Voltage Controller Crystal Oscillator |

DESCRIPTION OF THE PREFERRED EMBODIMENT

Figure 1A:
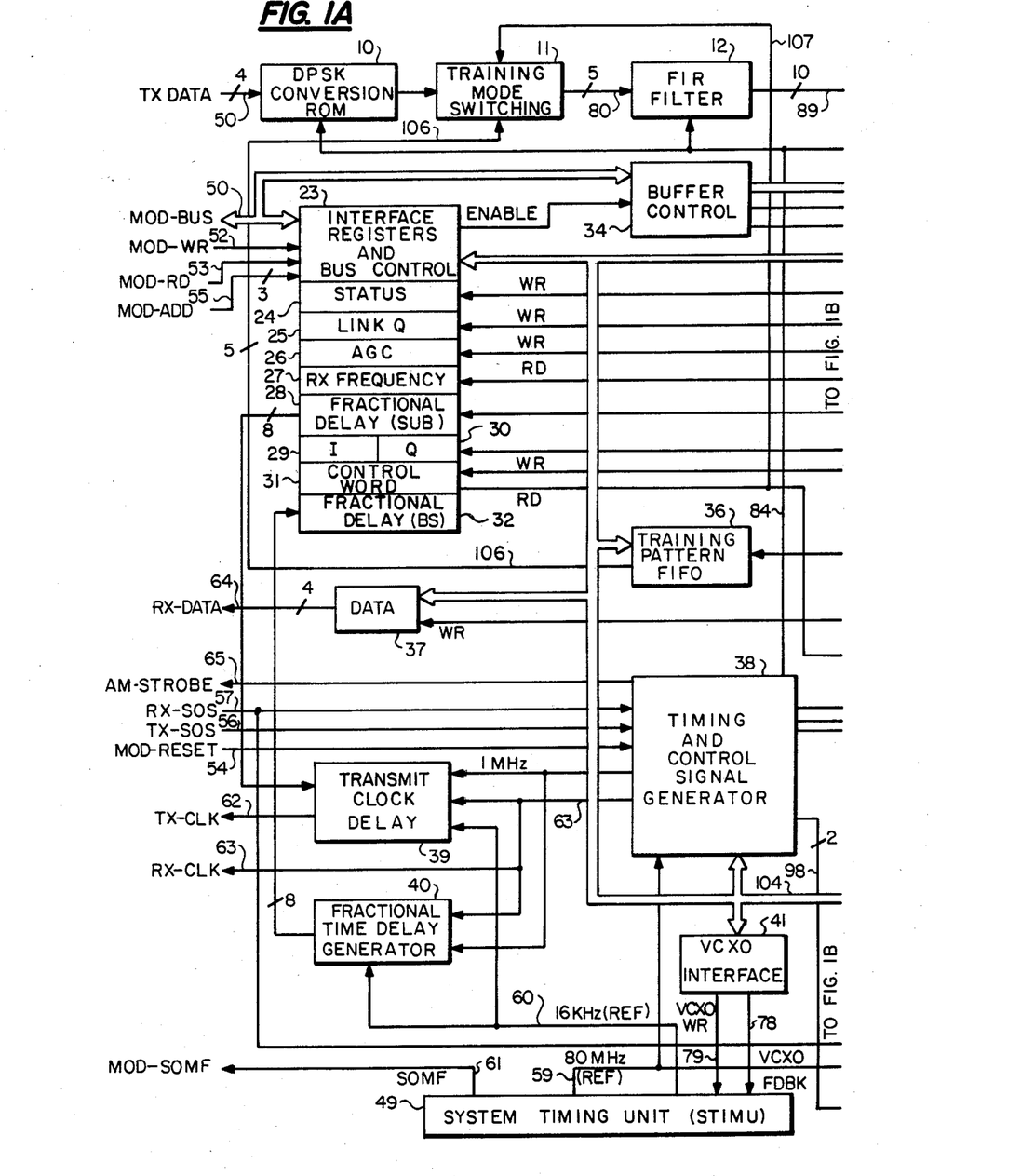
FIGS. 1A and 1B in combination show a block diagram of the preferred embodiment of the modem of the present invention.
Figure 1B:
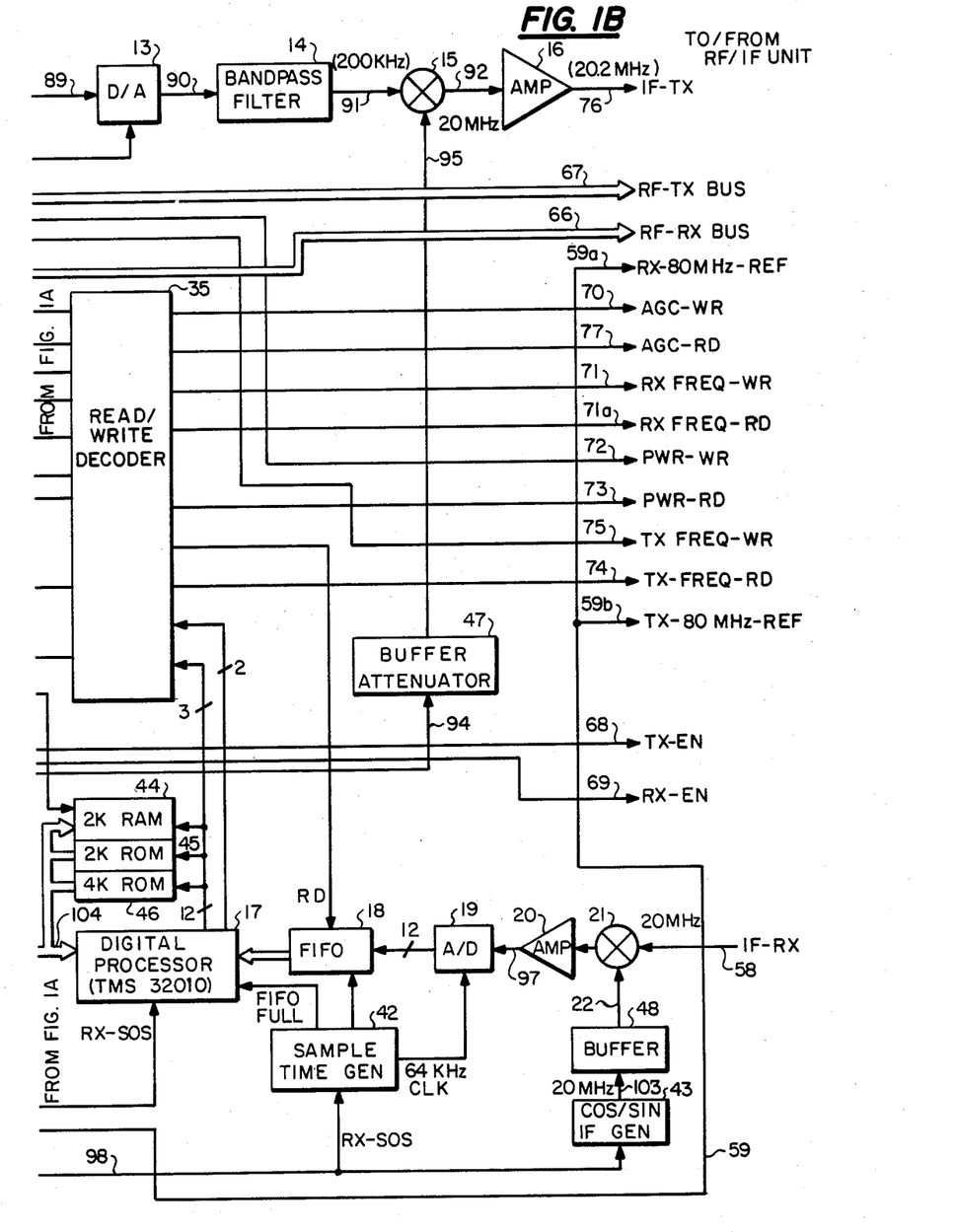

A preferred embodiment of the modem is shown in FIGS. 1A and 1B. The modulator section of the modem essentially includes a digital phase shift keying (DPSK) conversion read only memory (ROM) 10, a training mode switching unit 11, a finite-duration impulse-response (FIR) digital filter 12, a digital-to-analog converter (D/A) 13, a bandpass filter 14 having a center frequency of 200 KHz, a mixer 15, and an RF amplifier 16 centered at 20.2 MHz.

The demodulator section of the modem essentially includes a model TMS32010 digital microprocessor 17, a FIFO (first in-first out) stack 18, an analog-to-digital converter (A/D) 19, an amplifier 20, and a mixer 21.

The modem further includes several timing and control units that are essential to the modulation and demodulation functions performed by the modulator section and the demodulator section respectively. These units include interface registers and bus control unit 23, which includes a status register 24, a link Q register 25, an AGC (automatic gain control) register 26, an RX frequency register 27, a subscriber fractional delay register (SUB) 28, an in phase (I) register 29, a quadrature phase (Q) register 30, control unit 31 and a second fractional delay register 32. The modem timing and control units further include a buffer control unit 34, a read/write decoder 35, a training pattern FIFO (first in-first out) stack 36, a data latch 37, an internal timing and control signal generator 38, a transmit clock delay unit 39, a fractional time delay generator 40, a VCXO interface unit 41, a sample time generator 42, a COS/SIN IF signal generator 43, a 2K random access memory (RAM) 44, a 2K ROM 45, a 4K ROM 46, a buffer/attenuator unit 47 and a buffer unit 48.

The modem is connected to a system timing unit (STIMU) 49.

The modem interfaces are shown in FIGS. 1A and 1B. The modem receives most of its inputs from the CCU. Other inputs are from the RF unit and the timing units. The modem inputs are as follows:

To the modem from the channel control unit (CCU):

| TX DATA (lines 50) | A 4 bit symbol to be transmitted by the modem (4 bits for 16-ary PSK, 2 bits for QPSK, 1 bit for BPSK) |
|---|---|
| MOD BUS (51) | A bidirectional microprocessor bus that provides control/status information to/from the modem. |
| MOD WR (line 52) | The control signal to latch MOD BUS into the modem. |
| MOD RD (line 53) | The control signal to put modem status and other information onto MOD BUS for transmission to the CCU. |
| MOD RESET (line 54) | This CCU control will reset the modem. |
| MOD ADD (line 55) | Control signal to define different address locations and latched values inside the modem. |
| TX SOS (line 56) | Signal from CCU to modem to begin transmitting a TX slot. |
| RX SOS (line 57) | Signal from CCU to modem to begin receiving an RX slot. |

To the modem from the RF unit (RFU):

| IF RX (line 58) | IF receive frequency input from the RFU. |
|---|---|

To the modem from the system timing units (STIMU):

| 80 MHZ (line 59) | 80 MHz ECL clock from the base station or subscriber STIMUs. Output of the XO in the base station and VCXO in the subscriber station. |
|---|---|
| 16 KHZ (line 60) | Master TX CLK used in base station from STIMU. |
| SOMF (line 61) | Master start of frame in base station from STIMU. Not used in the modem, but forwarded to the CCU. |

From the modem to the channel control unit (CCU):

| TX CLK (line 62) | A 16 KHz clock signal that provides the CCU with the symbol transmit timing. Symbols are clocked into the modem with the rising edge of this clock. In the base station, all slots have the same master TX CLK. Thus all signals from the base station are sent at the same time. In the subscriber, the TX CLK is offset by the fractional range delay by the modem on information supplied by the CCU. |
|---|---|
| RX CLK (line 63) | The 16 KHz clock is derived from the received signal. (Always in subscriber, only during control slot acquisition in base station.) This clock will clock out the received symbol to the CCU and provide symbol timing to the CCU. |
| RX DATA (lines 64) | The four bit received symbol, clocked by RX CLK. |
| MOD BUS (50) | Status and data information from the modem. |
| MOD SOMF (line 61) | Forwarded SOMF/ from the STIMU to the CCU in the base station. |
| AM STROBE (line 65) | High to low transition on this line gives the CCU a rough frame marker during radio control channel (RCC) acquisition in the subscriber unit. This is a one shot line that will be pulsed when the RX TMS320 determines the approximate location of the AM hole. |

From the modem to each RF unit (RFU):

| RF RX BUS (66) | 8 bit bus between the modem and RF RX unit. This bus conveys AGC and frequency select information to the RFU receiver section. The modem controls AGC values to be sent, and forwards CCU frequency selection information. The frequency select information is fed to the modem over the MOD BUS 50. During the training mode, the modem will control the RF RX frequency selection. |
|---|---|

| | -continued |
|---|---|
| RF TX BUS (67) | 8 bit bus between the modem and RFU transmitter section. This bus conveys TX power level and frequency select information to the modulator section. The modem has nothing to do with these, thus the information is only forwarded to the RFU transmitter section. |
| RX 80 MHZ REF (line 59a) | ECL 80 MHz reference clock to the RFU receiver section. |
| TX 80 MHZ REF (line 59b) | ECL 80 MHz reference clock to the RFU transmitter section. |
| TX EN (line 68) | Line to RFU transmitter section to enable RF transmission. |
| RX EN (line 69) | Line to RFU receiver section to enable RF reception. |
| AGC WR (line 70) | Write strobe to latch AGC data into RFU receiver section. |
| RXFREQ WR (line 71) | Write strobe for frequency writes to RFU receiver section. |
| RXFREQ RD (line 71a) | Read strobe to read back receive frequency from RFU receiver section. |
| PWR WR (line 72) | Write strobe to latch power information into RFU transmitter section. |
| PWR RD (line 73) | Read strobe to read back power information from RFU transmitter section. |
| TXFREQ RD (line 74) | Read strobe to read back transmit frequency from RFU transmitter section. |
| TXFREQ WR (line 75) | Write strobe frequency writes to RFU transmitter section. |
| IF TX (line 76) | Transmitted signal at IF frequency to the RFU. |
| AGC RD (line 77) | Read strobe to read back AGC data from RFU receiver section. |

From the modem to the system timing unit (STIMU):

| | |
|---|---|
| VCXO FDBK (line 78) | A 10-bit data bus to VCXO with control information for frequency tracking. |
| VCXO WR (line 79) | Write pulse to VCXO circuit latching VCXO BUS into the VCXO. |

The modem modulator section transmits the information fed to it on TX DATA lines 50 by the CCU at 16-level PSK modulation. The modem transmits without the knowledge of the modulation level of the received information.

The input control lines are decoded inside the modem to select which register is to drive the 8 bit MOD BUS 50 between the modem and the CCU. Control information regarding the reception of a slot becomes active when the modem receives the RX SOS signal on line 57 from the CCU. This line interrupts the microprocessor 17 to begin demodulation on an incoming slot. At this time, the RFU receiver section is enabled by the modem with the RX EN signal on line 69.

At the end of each slot, the status information is updated to the registers 23 for the CCU to read.

In the subscriber station the CCU can command the modem to acquire the RCC signal from the base station. The main acquisition feature of the RCC is the AM HOLE of 8 symbols. In software, the modem scans the frequency selected by the CCU for the AM HOLE. The microprocessor 17 scans the frequency selected by the CCU for the AM HOLE. If an AM HOLE is present on this frequency, the microprocessor 17 will key in on it. After the microprocessor 17 is sure of the AM HOLE presence, it will pulse the AM STROBE line 65 low to the CCU signifying two things: (1) that the RCC signal is acquired and (2) that the AM STROBE is a rough start of frame marker. From there, the CCU should begin to look for the unique word in the RX data stream within a window of 0 to 3 symbols. Once the unique word is detected, the subscriber station CCU can adjust its frame and slot counters to align them to the base station's system frame.

The interface between the modem and RFU receiver station allows control of the frequency selection and AGC levels in the RFU. The CCU controls frequency selection and forwards its commands to the modem. The modem forwards this information to the RFU over the RX RF BUS 66. This bus 66 is also used to control AGC levels in the RFU receiver station. These AGC values are updated each symbol time and conveyed to the RFU receiver section.

Figure 6:
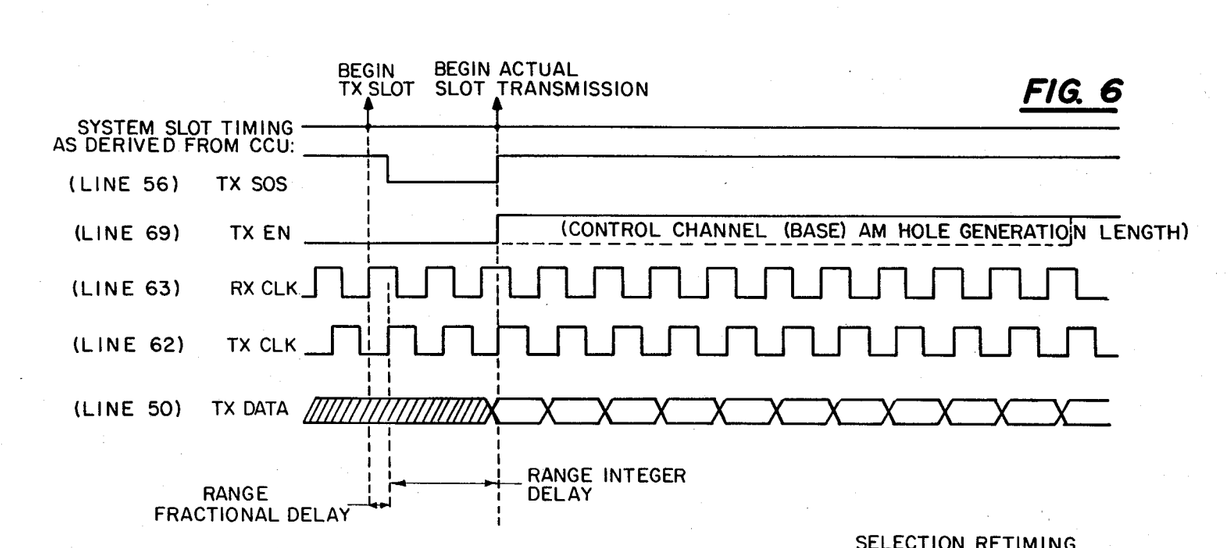
FIG. 6 shows the timing waveforms of certain control, timing and data signals involved in the operation of the modem.

The CCU modem interface is shown in FIG. 1. The timing for the transmit interfaces are shown in FIG. 6. These interfaces are at a low rate and thus require only standard TTL hardware interfaces. The modem provides the CCU with the 16 KHz symbol clock. Four TX DATA bits are on a parallel bus to the modulator section. An eight bit bus is provided for control/status information exchange. Control information is fed to the modem by the CCU through asynchronous interface registers 23. The contents of the registers become valid when the strobe TX SOS signal on line 56 is received by the modem, signifying to begin transmission of a slot. The CCU provides the following control information to the modem: (1) idle mode; (2) transmit voice channel; (3) transmit control channel; (4) training mode loopback; (5) TX CLK fractional symbol delay; (6) RF TX power level; and (7) RF/TX frequency selection. The RX frequency selection is stored in the RX frequency register 27.

The CCU has a direct interface to the RF TX unit from the MOD BUS 50 to the RF TX BUS 67 via the buffer control unit 34. The decoded addresses are fed to the RFU as write strobes to latch in TX power and TX frequency information. The modem must have control of the RF RX bus 66 for AGC updates to the RFU. Therefore, the modem forwards RX frequency information from the register 27 to the RF units at the beginning of each RX slot. This value is latched in the register 27 by the CCU. Also, the modem can change the RX frequency itself during the training mode with no need for the CCU to do so.

The modem modulator section is fully implemented in hardware and requires no adjustments. Symbols received from the CCU on TX DATA lines 50 at a rate of 16K symbols per second. The received symbols are phase modulated by the DPSK conversion ROM 10 and their resultant waveforms are shaped by the FIR filter 12 to provide good interference properties and not suffer amplitude or group delay distortion. The justification of this concept is made on the assumption that in the near neighborhood frequency band (within 50–100 KHz) to the band utilized there are no strong interfering signals (power densities of 30–40 dB above the signal). The 200 KHz bandpass filter 14 provides wide IF filtering (100 KHz) so that the transmitted signal will not suffer amplitude or group delay distortion and also filters out any harmonics generated by the digital filtering and D/A conversion done at baseband.

The main filtering is done at baseband by a fixed-coefficient digital FIR filter 12. This filter 12 is a six pole filter with a sampling rate of 50 samples per symbol per symbol duration in the FIR filter 12 in the modulator section.

Since no analog filtering is done at baseband, there is no need to implement two separate I and Q channels. In fact, the I and Q channels are implemented in the FIR filter 12. One time-shared channel, including the mixer 15, which multiplies by the IF frequency, upconverts this channel to IF. This channel has inherently equal gains for the I and Q samples. The I and Q sampling is now staggered by one-half a sample period, but this is corrected by the FIR filter 12.

Figure 2:
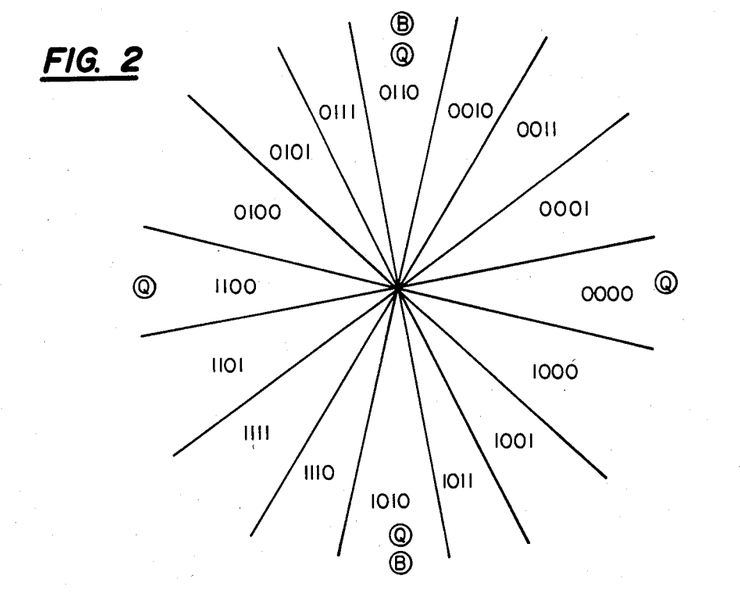
FIG. 2 shows the signal constellation used in Gray coding the symbols of the bit stream.

Gray code is used for digital coding by the DPSK conversion ROM 10. This insures that if a symbol was received in error, the most likely probability is that the error in a decoded symbol will be by only one bit. The signal constellation is shown in FIG. 2. The phases marked "Q" and "B" are the QPSK and BPSK symbols respectively.

The symbols are taken to be GRAY coded phase symbols. Any phase symbol is then converted to binary form from GRAY code and added to the binary form of the last phase symbol to form the DPSK symbol. Due to the FIR filter algorithm, every other symbol is inverted before input to the FIR filter 12. Therefore, the DPSK conversion is done by the use of the ROM 10. Four symbol bits, four bits from the previous symbol and one bit for inversion control are input to the DPSK conversion ROM 10, which outputs the DPSK symbol to the input of the FIR filter 12.

Figure 3:
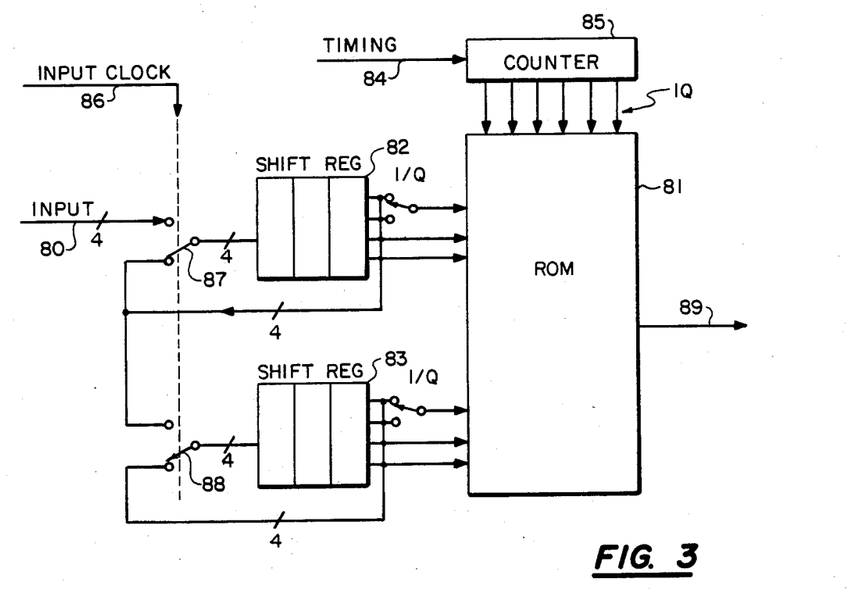
FIG. 3 is a block diagram of the FIR digital filter in the modulator section of the modem.

After DPSK conversion, the symbol is then provided on lines 80 to the FIR filter 12, which is a 6 tap, oversampled FIR filter. The FIR filter 12 includes a ROM 81 and two three-stage, four-bit shift registers 82, 83 as shown in FIG. 3. The FIR filter 12 serves to shape the transmitted symbols in accordance with the specifications of the frequency channel. The sampling rate of the ROM 81 is determined by a timing signal provided on line 84 from the timing and control signal generator 38 to a counter 85 connected to the ROM 81. An input clock signal is provided on line 86 to two input switches 87, 88 which enable data input into the shift registers 82, 83.

Figure 4:
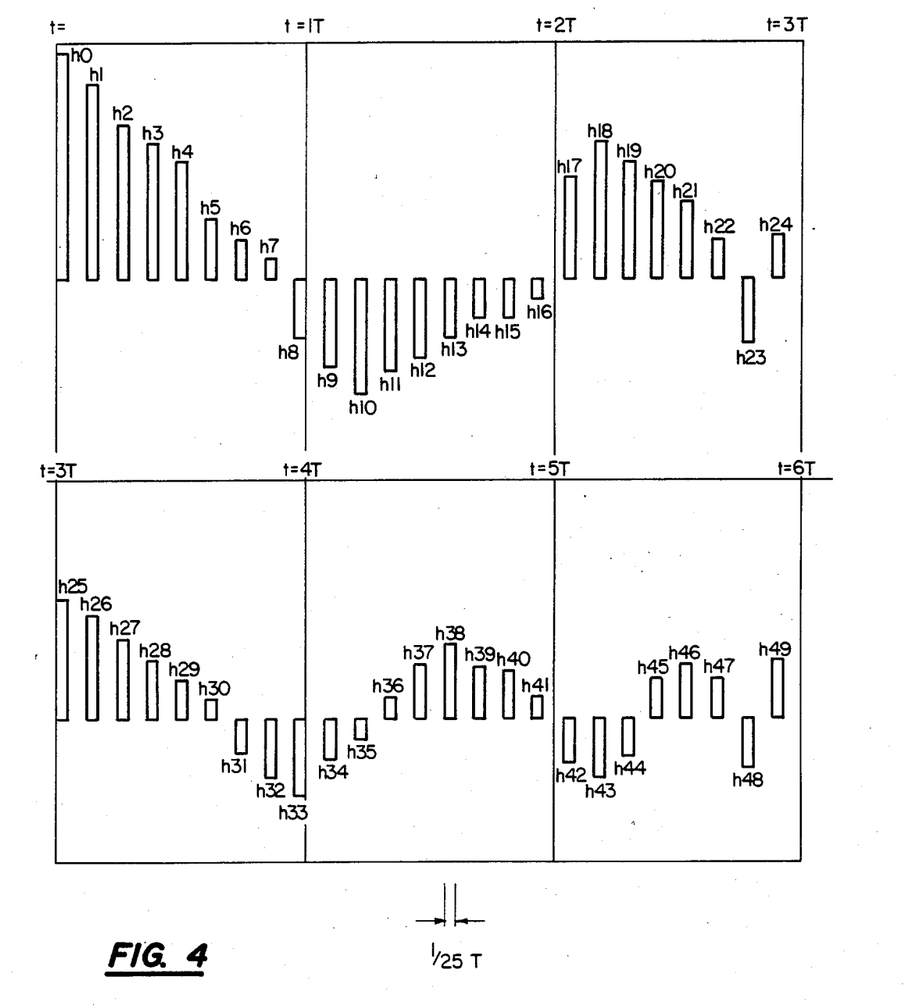
FIG. 4 illustrates the multiple sample impulse response pattern of the FIR digital filter in the modulator section of the modem.

Referring to FIG. 4, each of the six symbols in the two shift registers 82, 83 are sampled at a rate of 3/25 T (T=1/16 KHz). This oversampling scheme skews the samples so that only two symbols are sampled during any one 1/25 T sampling period. Therefore, there are two symbols input to the ROM 81 during each 1/25 T sampling period. Each 1/25 T sampling period is in turn divided into two parts: in phase (I) and quadrature (Q). During the first half of the 1/25 T period, the registers 82, 83 input the 3 bit in-phase component (I) of the symbol and during the second half of the period, the quadrature component (Q) of the symbol is input to the ROM 81. Thus the FIR filter output on line 89 is the time shared, digital I and Q waveforms of the waveform to be transmitted. These samples are then provided on lines 89 to the D/A converter 13 for conversion to an analog waveform. This waveform is then filtered by the bandpass filter 14 and provided on line 91 to the mixer 15 for upconversion to a 20 MHz IF signal on line 92.

The two shift registers 82, 83 shift two of the stored symbols into the ROM 81 at a rate of 1/25 T for the required computations. The symbols are converted to 3 bit I and Q gray code components by choosing either the 4th or 3rd symbol bit to the most significant bit (MSB) of the 3 bit component. The two least significant bits (LSBs) remain unchanged. This component choice is done at a rate of 1/50 T.

The ROM also needs five inputs from the counter 85 to signify which of the 25 sample periods is presently being computed. One additional input from the counter 85 is required to tell the ROM 81 whether the 3 bit inputs are the I or Q components of the input symbols.

The output signals stored in the transmitter FIR filter ROM 81 are computed to correct for any errors that may occur due to the 1/50 T difference in the I and Q time values. Also the IF filter in the RFU adds the two values together to form the correct transmitted waveform since its bandwidth is relatively small compared to the IF frequency. The FIR filter ROM 81 provides an output of 10 bit digital samples on line 89 at the rate of 800 KHz.

NULL symbols can be injected into the FIR filter 12 to represent symbols with no transmitted power. These are used in the training mode to input an "impulse" into the FIR filter 12. These NULLS can also be used to output the AM HOLES and guard bands that are required on the radio control channel (RCC).

The D/A converter 13 takes digital inputs from the digital FIR filter 12 and produces the required spectrum at multiples of 133.33 KHz starting at 66.67 KHz.

The bandpass filter 14 passes the 200 KHz spectrum with extremely small variations in passband attenuation and group delay. Attenuation ripple is less than 0.1 dB and delay variation is less than 1.5 microsec. The aliasing spectrums are attenuated more than 20 dB.

The desired signal out of the D/A converter 13 is centered at 200 KHz with a bandwidth of about 32 KHz. This signal is bandpass filtered by the band pass filter 14 before mixing to remove the signal components at n×133 KHz. By multiplying the 200 KHz waveform by 20 MHz, the mixer 15 mixes the I and Q samples with the SIN and COS components of the IF frequency. Thus, the 20 MHz signal can directly multiply the output waveform and the exact component multiplications will be handled automatically. Therefore, there is no need for a discrete SIN(IF)/COS(IF) generation circuit to multiply the I/Q samples from the D/A as is in the demodulator section. This also removes isolation feedthrough in the mixer 15 from the baseband to the output of the mixer 15.

The buffer attenuator unit 47 accepts an ECL level signal differentially at the IF frequency of 20.00 MHz on line 94 from the timing and control signal generator 38 and translates it to a 350 mV peak to peak signal which is used as the local oscillator signal provided on line 95 to the mixer 15. Another voltage divider (not shown) provides +7.5 VDC bias for the mixer 15.

The mixer 15 is an MC1496 active mixer. It frequency translates the I and Q component waveform from line 91 into a 20.20 MHz IF signal which is provided on line 92 along with all the other mixer products. Third order intermodulation products are down more than 40 dB. The mixer 15 is operated at a high level on the carrier input port and a low level on the modulating signal input port. This results in saturated switching operation of the carrier dual differential amplifier, and linear operation of the modulating differential amplifier. No carrier null is provided since the carrier at 20.00 MHz will be filtered out by a 20.20 MHz crystal filter in the RFU. The current sources are set to provide a current of 2 mA. An emitter degeneration resistor of 470 ohms (not shown) is provided to maintain the modulation signal input for linear operation at 1 volt peak.

The RF amplifier 16 includes an emitter follower buffer to isolate the mixer tuned circuit from the RF unit and provide a 50 ohm output impedance. To eliminate the effects of stray capacitance, device output capacitance and the capacitance of an emitter follower which buffers the mixer input, a parallel-tuned circuit is used on the mixer output which can be tuned for maximum gain. The overall gain of the mixer must be 10 dB since −10 dBm at 50 ohms is required at the output of the modem. A fixed inductor rather than a variable one may be used later in the mixer output tank circuit. The RF amplifier 16 amplifies the signal on line 92 from the output of the mixer 15 and provides the amplified signal to the RFU via IF-TX line 76.

During the idle mode, the modulator section of a base station modem transmits an idle pattern given to it by the CCU. In the subscriber station, since the modem operates half-duplex, the CCU places the modem in receive mode in all slots except during the slot in which the subscriber station itself is transmitting. This allows the demodulator section of the subscriber station modem to monitor AGC so as not to be too surprised when a burst comes in from the base station. The idle mode is used when there is a frequency for which at least one but not all slots are used. The empty slots are filled with the idle pattern. If a frequency has no conversation at all, the modulator section may be disabled.

Referring to the demodulator section of the modem, the mixer 21 presents a 50 ohm input impedance to the 20.00 MHz, −30 dBm signal received from the RFU on IF-RX line 58. The basic function of the mixer 21 is to down-convert the IF signal from the RFU to baseband and also to amplify it by 30 to 35 dB. A steady-state signal is provided on line 22 at 20.00 MHz. The steady-state signal on line 22 is the time multiplexed SIN/−COS/−SIN/−COS signal from the COS/SIN IF generator 43. A model MC 1496 active mixer 21 is used with the local oscillator input signal on line 22 run at high level and the modulated signal on line 58 run at a low level. The mixer output on line 97 at baseband is differentially AC coupled to the amplifier 20, which is a differential amplifier. A highpass filter is formed by capacitor coupling from the mixer 21 and the input resistor of the differential amplifier 20 and has a cutoff at approximately 1 Hz.

The buffer unit 48 provides interface between the ECL level 20.00 MHz generator 43 and the mixer 21. The buffer unit 48 provides a 350 mV peak to peak signal to drive the carrier input into saturated switching and also provides a +7.5 VDC bias for this input.

Figure 5:
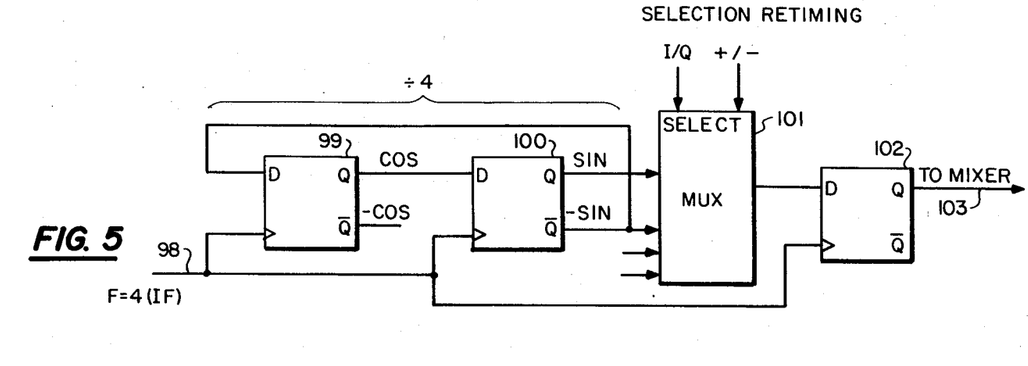
FIG. 5 is a block diagram of the SIN/COS IF generator in the demodulator section of the modem.

The IF SIN/COS generator 43 is shown in FIG. 5. The generator 43 includes ECL parts operating at four times the tracked IF frequency in response to a 4 IF timing signal on line 98 from the timing and control signal generator 38. Referring to FIG. 5, two flip flops 99, 100 act as a divide by four counter with each of their outputs being 90 degrees out of phase. A 4×1 multiplexer (MUX) 101 switches between the SIN, COS, −SIN, −COS outputs. The output of the MUX 101 is reclocked by another D flop 102 and output on line 103 to the mixer 21. This circuit provides a perfect 90 degree phase shift between the four components. The single, time multiplexed channel also assures that the I and Q components arrive with exact equal gains.

The timing diagram for the demodulator section also is shown in FIG. 6. The modem provides the CCU with the four data bits and their 16 KHz symbol clock. The address lines and an 8 bit bus provide status/control interchange between the two units.

The amplifier 20 accepts the differential output from the mixer and amplifies it be approximately 25 dB. The amplifier 20 provides an AC-coupled ±10 volt peak-to-peak signal to the A/D converter 19 with very low distortion.

The A/D converter 19, which is a TRW 12 bit A/D converter, is used to convert the baseband spectrum from the differential amplifier 20 into digital data for the microprocessor 17 to process. The sample rate is four times per symbol (64 KHz).

During normal operation, digital processing is done by the TMS320 microprocessor 17. The microprocessor 17 operates at 20 MHz with 4K bytes of memory from the 4K ROM 46. The port address pins are used to address I/O registers between the demodulator section and the CCU or the special diversity combiner circuit.

The microprocessor 17 receives the I/Q data from the mixer 21 at a sampling rate of 64 KHz. The data is again time multiplexed over one frequency channel as is done in the modulator section. The microprocessor 17 performs the filtering and demodulation of the waveform. The microprocessor 17 then outputs the received symbol over bus 104 to the data latch 37 which provides the symbol to the CCU over the RX DATA lines 64 with a pulse of the RX CLK signal on line 63 at a 16 KHz rate.

Receiver status is placed in the status register 24 and the I/Q samples are placed in I register 29 and the Q register 30. The CCU will read status while the I/Q samples are required for an external diversity combiner circuit. The control/status interfaces and functions are described below.

The base station modem operation is assigned to a fixed RF frequency. Communication at the base station is full duplex. Therefore the modem modulator and demodulator sections are operating simultaneously. When the modem also is assigned to be the control frequency channel modem, it only transmits and receives information with the radio control channel (RCC) format during the allocated control slot period. In the base station, an OCXO located in the system timing unit (STIMU) 49 is fixed and acts as the master clock of the system. Therefore, no frequency deviations will occur on reception.

All transmissions from the base station modems are clocked by the master TX CLK (16 KHz) signal on line 60. The fractional time delay generator 40 in the base station modems provides to the base station CCU the fractional part of the symbol time between the master TX CLK signal on line 60 and the derived RX CLK signal on line 63 in the modem. This information is then sent to the subscriber unit via the radio control channel so that the subscriber will delay its transmission in order that its signal is received at the base station synchronous with all other slots.

All operations in the subscriber station modem are derived from the received clock (RX CLK) signal which is recovered from the received transmission by the timing and control signal generator 38. This serves as the master clock of the subscriber station. The TX CLK signal on line 62 from the transmit clock delay circuit 39 to the CCU is not a master clock as in the base station. It is derived from the RX CLK signal on line 63 and delayed by the transmit clock delay circuit 39. The duration of such delay is provided by the subscriber station CCU, fractional delay (SUB) register 28 and retrieved therefrom by the transmit clock delay circuit 39. The subscriber station CCU receives the delay via the radio control channel from the base station CCU. The delay is determined by the distance between base and subscriber stations. The subscriber station CCU feeds this fractional time information to the fractional delay (SUB) register 28 in the modem through MOD BUS 50. The modem itself incorporates the fractional delay through the transmit clock delay circuit 39. The CCU accounts for the integer symbol delay by insertion of the TX SOS signal on line 56 to the modem delayed by the correct number of symbols. This process aligns the signals arriving at the base station from variations in the range of all subscriber stations.

There are many sources of delay in the modem system that have a pronounced affect upon the system timing. Such things include analog filter delays, propagation delays, FIR filter 12 processing delays, etc. These delays skew the TX and RX frames from one another, and these skews must be taken into careful account.

The delay paths from the modulator section to the demodulator section are listed below along with their estimated values.

| | |
|---|---|
| Tta | TX analog delay. Approximately .55T. |
| Ttr | Transition delay between TX and RX in RF unit. Approximately 1.9T. |
| Td | Propagation delay. 1.2T max (one way). |
| Tra | RX analog delay. Approximately 5.77T. |
| Th | Time during the sampling of RX analog filter output before A/D conversion. Approximately 0.03T. |
| Tc | A/D conversion time. Approximately 0.22T. |
| Tf1,Tf2 | RX FIR "window". To receive a peak at time t=0, the filter must start sampling at t=−Tf1 and continue until Tf1 approximately 3.5T, Tf2 approximately 3.25T. |
| To | TMS processing delay between "peak" and TMS output. Approximately 4.5T. |
| Tw | TX waveform length (6T). |
| Tcrt | Compensation delay between RX and TX (Subscriber); minimal for the farthest Subscriber and maximal for the nearest. |
| SBn | Nearest Subscriber. |
| SBf | Farthest Subscriber. |

The delay between the TX SOS in the base station and the first received analog symbol "peak" at the base station is +7.4 symbols. Therefore, there is a skew between TX and RX slots. To correctly decode the incoming phase, the modem must begin sampling about 3.5 symbols before the "peak" arrives. Therefore, the skew between TX SOS/ and the beginning of RX sampling is about 4 symbols in length.

At the base station, the start of the RX slot occurs about 4 T after the start of the TX slot. The RX slot start is defined as the time the first analog sample is taken in order to detect the first "peak" that is received.

The farthest subscriber station modem will start its TX slot 4 T before the start of the RX slot of the base station modem. Other subscribers may delay the start of their TX slots.

In the overall RF telephone subscriber system, round trip transmission delays due to range can occur anywhere from 0 to 3 symbol times in length. Therefore, in order that the received communications at a base station be synchronous, the subscriber station must be able to shift its transmit clock signal 0 to 3 symbol times relative to the derived received clock (RX CLK). The time delays are computed in the base station and sent over the control channel, and interpreted by the CCU. The CCU then provides fractional delay constants to the subscriber station modem in order to delay the TX CLK. The fractional delay is an 8 bit value which is written in the fractional delay (SUB) register 28. Integer symbol delay is controlled by the CCU. The strobe TX SOS signal on line 56 is generated 0, 1 or 2 symbols delayed according to range values received from the base station.

During the reception of any slot, the modem performs frequency synchronization by acquisition and then continues tracking. In the subscriber station, the VCXO is under direct control of the microprocessor 17 through a D/A converter in the VCXO interface 41. The microprocessor 17 frequency acquisition and tracking algorithms compute the changes in the VCXO necessary to maintain synchronization.

During the receipt of any slot, the microprocessor 17 also performs bit synchronization on the bit sync pattern of the received data stream. An algorithm performs a bit tracking loop. The microprocessor 17 has control over a variable frequency divider of the 80 MHz VCXO or OCXO (only during control slot demodulation). Inside of the bit tracking loop, the microprocessor 17 modifies the frequency division in order to obtain bit synchronization. During the reception of a voice channel, the division values have step sizes of 0.1% of 16 KHz, but during a control slot the values may change more drastically, as much as +/−50%.

Frame synchronization is handled in completely different ways in the base station and the subscriber stations. In the base station, a master SOMF (start of modem frame) signal is forwarded on line 61 to the CCU via the modem. This is the master SOMF signal used for all transmission from the base station. From this and the master system symbol clock signal (16 KHz) on line 60, the CCU can derive all slot and frame timing.

In the subscriber station during initial acquisition, the microprocessor 17 searches for the AM HOLE in the RCC. IF the AM HOLE is detected, the microprocessor 17 will count it for a few frames and then cause the timing and control generator 38 to provide the AM STROBE/ marker on line 65 to the CCU at the frame location of the AM HOLE. The CCU uses this strobe marker to set up initial frame marker counters (windowing) that can be modified by CCU software for exact frame sync. This also signifies that the AM HOLE was detected and the RCC is acquired.

Slot synchronization is under the control of the CCU. The signals TX SOS on line 56 and RX SOS on line 57 are commands to the timing and control generator 38 to begin the transmission or reception of a slot. These signals are synchronized to the TX CLK signal on line 62 and RX CLK on line 63 respectively.

The modem demodulator section operates in either an off-line or an on-line mode according to bit 7 of the RX control word in the control word register 31. To switch the demodulator section from one mode to the other, the CCU sends MOD RESET, writes the required command in the RX control word register 31 via the MOD BUS 50, and then disables MOD RESET signal.

In the off-line mode, the external memory on the microprocessor is provided by 2K words from the ROM and 2K words from the RAM. The CCU commands the modem to enter this mode after power up and once every predetermined number of hours, while the modem is not transmitting or receiving, in order to execute self-test and training routines.

The self-test routine tests the ROMs 45, 46, the internal RAM and the external RAM 44 and the interface to the CCU. It sends the test results to the CCU through the status register 24.

The training routine includes sending a training signal to the demodulator section and calculating the coefficients of the FIR filter embodied in the microprocessor 17. It is done off-line every predetermined number of hours, while the modem is not transmitting or receiving data.

In the on-line mode, the modem receives signals from either the control channel or a voice slot, according to the RX section control word in the control word register 31. The on-line software executes the following routines.

An initialization routine is performed by the microprocessor 17 at power up or after a reset signal is received. This routine reads the control word in the register 31 and calls other routines according to the control word.

This routine is activated when the CCU sends the modem a MOD RESET signal on line 54 and a command over the MOD BUS 50 to the control register 31 to enter the on-line mode. This routine executes a checksum test on an on-line PROM, initializes parameters, reads the control word register 31 and branches to the appropriate routine.

A frequency acquisition routine is run in the subscriber station modem only, when receiving the control channel, in order to synchronize the subscriber station VCXO frequency to the base station crystal frequency. Since the transmit, receive and IF frequencies are derived from the VCXO in the subscriber station or the OCXO in the base station, this will cause all the frequencies to be synchronized.

This routine is used in the subscriber station modem only. It is activated by a command from the CCU while the demodulator section is set at the control channel frequency. Its function is to synchronize the VCXO frequency to that of the OCXO in the base station. It does this by first looking for the AM Hole which is a small period of time during which there is no transmission from the base station. After that the base station transmits an unmodulated carrier signal. When receiving this waveform the IF mixer output will be another sine waveform whose frequency is proportional to the difference between the VCXO and the base station crystal oscillator frequency. The modem software samples the I and Q channels at certain intervals and perform a phased locked loop function, i.e., determines the phase change for each interval, put it through a low-pass filter, and send it as a correction word to the VCXO. The modem determines that frequency acquisition is achieved when the phase change becomes lower than a certain level. If the AM hole is not detected during a certain period of time, the module will send an error message to the CCU indicating that the receiver is not tuned to the control channel.

The routine is called by the initialization routine and sends a status word from the status register 24 to the CCU indicating whether frequency acquisition was achieved or not.

When called by the initialization routine the frequency acquisition routine samples the I and Q channels looking for the AM hole and at the same time performs an AGC loop. If the AM hole is not detected during a predetermined number of samples, this routine conveys this information to the CCU via the status register 24. The CCU then will switch to another possible RCC frequency and reactivate the frequency acquisition routine.

After detecting the AM hole this routine provides a phase locked loop for the time during which an unmodulated carrier is transmitted. In this loop, I and Q samples are taken and the phase angle of the sampled signal is calculated.

The calculated angle is subtracted from the previous phase and the result is low-pass filtered and sent as a control word to the VCXO. AGC is also calculated during the loop using the signal amplitude. At the end of the specified duration if the phase deviations are less than a predetermined amount, the module places "1" in the status register 24 and if the deviations are still larger than this amount a "2" is placed in the status register 24. In the latter case, the frequency acquisition routine may be reactivated for more than one slot.

A bit synchronization routine is run in both the subscriber station and base station modems, when receiving the RCC and after completing the frequency acquisition routine. In the subscriber station modem, its output will be used to synchronize the 16 KHz symbol clock to the base station transmission. In the base station modem it is used to determine the fractional delay to be incorporated in the subscriber station transmission so as to coincide with the base station modem clock.

A slot receive routine is called when the modem is ready to receive data, i.e., after frequency and bit synchronization are achieved. Its main functions are (a) to initialize parameters for the symbol receive routine (described below); (b) to activate the symbol receive routine when the first symbol is sampled; and (c) to determine link quality and other information after receiving all symbols in the slot.

This routine is called by the initialization routine at the beginning of each receive slot. Its main function is to initialize the parameters for the symbol receive routine. After completing this task it waits until all samples of the first symbol in the slot are stored in the FIFO stack 18 and then branches to the symbol-receive routine.

The processing tasks of this routine are:
1. Reading the modulation level (ML from the control word register 31 where ML can be 2, 4 or 16;
2. Calculating the half symbol value given by the equation:

$$HS = \frac{180}{ML} \quad \text{(Eq. 1)}$$

3. Calculation of a MASK used for truncating the LSBs from the decoded phase. The MASK depends on ML and on the number of bits used to represent the decoded phase, whereby
if $2^n$ represents a 22.5 degree phase angle, then $$\begin{aligned} MASK &= 8 \times 2^n \text{ for ML} = 2 \\ &= 12 \times 2^n \text{ for ML} = 4 \\ &= 15 \times 2^n \text{ for ML} = 16 \end{aligned}$$

4. Reading previous the AGC for this slot from the AGC register 26 and sending it (for the base station only).
5. Waiting until the end of the sampling for the first symbol, and then branching to the symbol receive routine; and;
6. After receiving all symbols in the slot, sending the link quality signal from the link quality register 25 to the CCU.

The symbol receive routine is activated once per symbol time while receiving data and its functions include: reading I and Q samples for the symbol; (b) filtering the I and Q samples; (c) determining the transmitted symbol and sending it to the CCU; (d) executing a phase-lock-loop to synchronize the VCXO to the incoming signal; (e) executing a bit tracking algorithm; (f) AGC calculation; and (g) accumulating information for link quality calculation.

The routine is activated once per symbol when all the four samples pertaining to a symbol are stored in the external FIFO stack 18. This routine reads the samples into the memory and then processes them to determine the transmitted symbol. Also AGC is calculated from the signal amplitude. The deviations in the received symbol from the transmitted one are used in the AGC, link quality and bit tracking algorithms. The run-time of this module is less than one symbol time, i.e., 62.5 microsec.

After receiving and storing the four I and Q samples for a particular symbol, this routine performs the following tasks:

1. FIR filtering of the received samples. (The FIR coefficients are determined by the training routine discussed below);
2. Determining the signal level and using it for AGC;
3. Determining the received phase angle, subtracting the previous one, rounding up the result, Gray coding the rounded-up result and sending the coded result to the CCU;
4. Executing the bit tracking algorithm. (Its output is accumulated for all symbols and sent at the end of the slot. It is used to synchronize the subscriber RX clock to the base transmission.);
5. Executing a phase lock loop to synchronize the VCXO to the base station oscillator. (The output is sent to the VCXO at the end of the slot, in the subscriber station only.); and accumulating data for link quality and sending the information to the CCU via the link quality register 25 at the end of the slot.

Internal clock signals required by the modem are generated by the timing and control signal generator 38 from the master 80 MHz clock signal on line 59. The modem uses the master 16 KHz clock signal on line 60 as the TX CLK for transmission. Therefore, all transmissions out of the base station are synchronous with each other.

The subscriber station clock signals are derived completely from a master 80 MHz VCXO in the subscriber station timing unit. The VCXO is controlled by the VCXO FDBK signal on line 78 from the modem. From the VXCO FDBK signal on line 78, all receive and transmit clocks are calculated. The timing and control signal generator 38 then provides the CCU with the 16 KHz RX CLK signal on line 63 derived from the incoming data stream. The CCU itself detects the unique word in the control channel and can determine frame and slot markers from the unique word and the RX CLK signal on line 63. The AM STROBE signal on line 65 is derived by the timing and control signal generator 38 from the signal demodulated by the microprocessor 17 and informs the CCU where to look for the unique word.

In the subscriber station the microprocessor 17 computes the bit and frequency tracking parameters and adjusts the timing by outputting the VCXO FDBK and VCXO WR signals to the STIMU 49. To adjust the frequency, the microprocessor 17 outputs to a D/A converter in the VCXO interface 41 that feeds the voltage into the VCXO. This VCXO frequency is then divided by 5 to 16 MHz. The 16 MHz clock is divided by 5 again to produce a 3.2 MHz clock. The timing and control signal generator 38 divides this by 4 to produce the 800 KHz clock signal required for the TX FIR filter 12. The sample time generator 42 divides a 3.2 MHz clock signal by 50 to produce the 64 KHz sampling clock signal. The sample time generator 42 is under control of the microprocessor 17 to cause a delay during control channel acquisition. This allows large jumps of ±16 KHz clock periods for fast acquisition.

The self adapting training mode is a looped-back state that the modem enters to train the demodulator section digital FIR filter coefficients stored in microprocessor 17 to correct for any analog filter degradations that may occur in time or with temperature. The analysis is done by looping back the transmitter data through the RF unit and receiving a known pattern in the demodulator section of the modem. The coefficients are optimized over a 5 constraint LaGrangian system. These constraints are (1) the received data stream; (2) the data stream delayed by 0.05 T; (3) the data stream advanced by 0.05 T; (4) the data stream from the adjacent upper channel; and (5) the data steam from the adjacent lower channel.

During the training mode, the microprocessor 17 provides to the FIR filter 12 of the modulator section a series of 32-symbol-long training patterns on line 106 from the FIFO stack 36 that is enabled during the training mode. Advances and delays skew the two streams by 0.05 T.

The CCU places the modem into the training mode to allow the modem modulator section to read the special training pattern from the FIFO stack 36 by operating the training mode switching unit 11 by a control signal on line 107 from the control word register 31. The demodulator section is also advanced and then delayed for some of the tests. When the process is complete, the modem sends a status message to the CCU that the coefficients are computed. At this time, the CCU tests the modem by placing it in normal operation and writing out a set pattern, commanding the RFU to loopback, and read the returned data and test for validity.

The training mode is initiated by the CCU setting appropriate control register bits and sending a MOD RESET signal on line 54 to the modem. This reconfigures the microprocessor 17 from using 4K of ROM and no RAM to using 2K of ROM 45 and 2K of the RAM 44. The 2K ROM 45 holds the training mode algorithms and the 2K RAM 44 provides scratchpad memory while the filter coefficients are being computed.

One algorithm computes the adjacent channel characteristics. To determine adjacent channel interference, the modem modulator section must be able to transmit at a frequency that is removed 25 KHz from the received frequency. This is done by the CCU reading the status register in the modem. The information in the status register 24 directs the CCU to change frequencies in the RFU receiver section at the modem's will.

The microprocessor 17 executes the training routine. The function of the training routine is to compute the FIR filter coefficients in the microprocessor 17. The modulator section is activated in a loopback mode to send a certain sequence of symbols. This sequence is transmitted to the demodulator section via the RFU in five different modes as follows: (1) normal mode; (2) advanced timing mode; (3) delayed timing modes; and (4 and 5) on the adjacent upper and lower channels. In the latter two modes, the AGC setting is increased by 23 dB.

The demodulator section uses the samples of the input waveform to create a positive definite symmetric matrix A of order 28. Also, a 28-word vector V is created from the input samples. The coefficients vector C is given by:

$$C = A^{-1} V \quad \text{(Eq. 2)}$$

An algorithm will be used to calculate $B = A^{-1}$ given A. Due to round-off errors, B will not be accurate, so an iterative method is used to calculate a more accurate C.

The calculations yield a vector of 28 complex FIR filter coefficients.

The modulator section is activated in the training mode to transmit five similar pairs of sequences. Each pair consists of the following two sequences: (a) an I sequence of 9 null symbols, a "1" symbol and 22 null symbols; and (b) a Q sequence of 9 null symbols, a "j" symbol and 22 null symbols. The "1" can be any symbol. The "j" is the symbol that differs from "1" by 90 degrees.

The demodulator section processing tasks are: (1) to adjust the AGC so that the signal peak in the normal mode is 50 to 70% of the maximum (the AGC is increased by 23 dB for the fourth and fifth modes); (2) to read and store the input samples (the first 32 samples are discarded and the next 64 samples are stored for each sequence); and (3) to build the matrix A (28, 28). The following process is done in the normal mode (first mode):

$$A(I,J) = A(I,J) + \Sigma X(4N-I) \times (4N-J) \quad \text{(Eq. 3)}$$

The addition is for all N that satisfy:

$$0 <= 4N-I < 64 \text{ and } 0 <= 4N-J < 64 \quad \text{(Eq. 4)}$$

For the advanced and delayed modes (second and third modes), the same process is performed except that the term resulting from N=8 is not added. In the fourth and fifth modes (transmitting on the upper and lower adjacent channels) the following process is performed:

$$A(I,J) = A(I,J) + \Sigma X(2N-I) \times (2N-J) \quad \text{(Eq. 5)}$$

The addition is for all N that satisfy:

$$0 <= 2N-I < 64 \text{ and } 0 <= 2N-J < 64 \quad \text{(Eq. 6)}$$

Further demodulator section processing tasks in the training mode are:

4. Creating the vector V(1:28) from the samples of the first pair of sequences:

a.

$$I\{V(I)\} = X(32-I) \quad \text{(Eq. 7)}$$

where X are samples of the first (I) sequence; and b.

$$Q\{V(I)\} = X(32-I) \quad \text{(Eq. 8)}$$

wherein X are samples of the second (Q) sequence; and

5. Finding the coefficients vector C by solving $A \times C - V = 0$. This is done by first finding B the inverse of A. Due to round-off errors B will not be accurate. The following iterative method is used to solve for an accurate C.

$$C_o = B \times V \quad \text{(Eq. 9)}$$

$$C_{n+1} = C_n - b \times B(A \times C_n - V) \quad \text{(Eq. 10)}$$

b is a predetermined value <1.

We claim:

1. A multiple phase demodulator comprising
an input means to provide a phase-modulated input signal;
a generator for generating a steady-state signal comprising a sine wave alternatley shifted ninety degrees;
a mixing means for combining said steady-state signal with said input signal to form a resultant signal;
an analog-to-digital converter for converting said resultant signal to digital form;
means including a digital memory means to conform the converted resultant signal to signals of predetermined frequencies; and
recovery means to recover the digital information from said conformed resultant signal, thereby producing a digital bit stream as output.

2. The demodulator of claim 1 wherein an input filter is coupled to said mixing means.

3. The demodulator of claim 1 wherein
said recovery means is in circuit with a time delay compensation means for the purpose of compensating for varied time delays in the reception of different input signals.

4. The demodulator of claim 1 wherein said recovery means is in circuit with a control information extracting means to extract control information from said output.

5. The demodulator of claim 1, wherein said recovery means is in circuit with a timing information extracting means for extracting timing information from said output.

6. The demodulator of claim 1, wherein said recovery means is in circuit with sequence information extracting means to extract sequence information from said output.

7. The demodulator of claim 1, wherein said recovery means is in circuit with frame synchronization information extraction means to extract frame synchronization information from said output.

8. A modem comprising a multiple phase modulator and a multiple phase demodulator;
said modulator comprising
means for converting an input constituting a digitized bit stream into symbols, each symbol being defined by a given number of successive bits;
a phase modulation means for phase modulating each symbol;
a digitally implemented filter for shaping and generating a waveform from each of said symbols in accordance with the specifications of the frequency channel over which said symbols are transmitted, each of each waveforms constituting a transmitted symbol; and
a digital-to-analog converter for converting each of said transmitted symbols to an analog signal;
said demodulator comprising
an input means to apply a phase-modulated input signal from said modulator;
a generator for generating a steady-state signal containing both in-phase (I) and quadrature phase (Q)

waveforms that are alternately phase shifted ninety degrees from each other;

a mixing means for combining said steady-state signal with said input signal to form a resultant signal;

an analog-to-digital converter for converting the resultant signal to digital form;

means including a digital memory means to conform the converted resultant signal to signals of predetermined frequencies; and recovery means to recover the digital information from said conformed resultant signal, thereby producing a digital bit stream as an output.

9. The modem of claim 8 wherein a channel control means is in circuit with said phase modulation means and wherein a scanning means is in circuit with said channel control means to scan the frequency selected by the channel control means to determine the presence or absence of an amplitude modulation signal comprising a predetermined number of symbols, and means to acquire a radio control channel when said amplitude modulation signal is present.

10. A system for converting a bit stream, wherein each given number of successive bits defines a symbol, into a phase modulated intermediate frequency (IF) signal at a predetermined IF frequency, comprising phase modulating means for phase modulating each of said symbols;

filtering means for digitally filtering each phase modulated symbol to provide a filter output comprising time-shared digital in-phase (I) and quadrature phase (Q) waveforms, said filter output, when converted to an analog signal, providing a modulation signal of a modulation frequency that is centered about a predetermined frequency and that deviates therefrom in accordance with the value of the phase modulated symbol;

means for converting the filter output into an analog signal to provide a modulation signal; and means for multiplying said modulation signal by a fixed predetermined frequency having sin and cos components.

11. A system according to claim 10, wherein the phase modulating means comprises means for converting the symbols in accordance with a differential phase shift keying (DPSK) code.

12. A system according to claim 10, wherein the filtering means filters a plurality of phase modulated symbols simultaneously in a sequentialy overlapping relationship.

13. A system according to claim 12, wherein the filtering means comprises a finite-duration, impulse response (FIR) digital filter.

14. A system according to claim 13, wherein the FIR filter samples each phase modulated symbol a predetermined number of times, with successive simultaneous samples being factored together in accordance with a predetermined sequential pattern to provide the filter output that, when converted to an analog signal, provides said modulation signal.

15. A system according to claim 14, wherein the FIR filter comprises a read only memory (ROM) that provides the filter output in accordance with the combined digital values of the simultaneously sample phase modulated symbols.

16. A system according to claim 10, wherein the filtering means comprises a finite-duration, impulse response (FIR) digital filter.

17. A system according to claim 16, wherein the FIR filter samples each symbol a predetermined number of times, with successive samples being factored in accordance with a predetermined sequential pattern to provide the filtered signal that, when converted to an analog signal, provides said modulation signal.

18. A system according to claim 17, wherein the FIR filter comprises a read only memory (ROM) that provides the filtered signal in accordance withthe digital value of the phase modulated signal.

19. A system according to claim 16 further comprising demodulating means for converting a received phase modulated IF signal to the bit stream from which it was derived, and wherein the demodulating means comprises means for mixing the received phase modulated IF signal with a steady-state signal of the same frequency as the steady-state signal used to produce said phase modulated IF signal to thereby provide a received analog signal;

means for converting the received analog signal into a received digital signal;

a FIR digital filter for digitally filtering the received digital signal to provide phase modulated symbols; and means for converting the received phase modulated symbols into a received bit stream corresponding to the bit stream from which the received phase modulated IF signal was derived.

20. A system according to claim 19, wherein, within the demodulating means, the FIR digital filter comprises a microprocessor for filtering of the received digital signal, and wherein the microporcessor includes a memory for storing FIR filter coefficients for use in the filtering of said received digital signal.

21. A system according to claim 20, further comprising means for providing a sequence of predetermined symbols to the first-recited filtering means;

means for providing to the demodulating means the phase modulated IF signal provided by the first-recited mixing means; and means in the microprocessor for adjusting the FIR filter coefficients stored in the microprocessor memory until the received phase modulated symbols correspond to the sequence of predetermined symbols provided to be first recited filtering means.

22. A system according to claim 19, wherein, within the demodulating means, the combination of the FIR digital filter and the means for converting the phae modulated symbols comprises a microprocessor for the filtering of said received digital signal and for conversion of the received phase modulated symbols, and wherein the microprocessor includes a memory for storing FIR filter coefficients for use in the filtering of said received digital signal and a memory for storing a predetermined code for use in the conversion of the received phase modulated symbols.

23. A system according to claim 10, further comprising demodulating means for converting a received phase modulated IF signal to the bit stream from which said received phase modulated IF signal was derived.

24. A system according to claim 23, wherein the demodulating means comprises means for mixing the received phase modulated IF signal with a steady-state signal of the same frequency as the steady-state signal used to produce the received phase modulated IF signal to thereby provide a received analog signal;

means for converting the received analog signal into a received digital signal;

means for digitally filtering the received digital signal to provide phase modulated symbols; and means for converting the received phase modulated symbols into a received bit stream corresponding to the bit stream from which the received phase modulated IF signal was derived.

* * * * *